United States Patent
Zguris

(10) Patent No.: US 6,478,829 B1
(45) Date of Patent: Nov. 12, 2002

(54) METHOD FOR PRODUCING A BATTERY WITH SEPARATORS CONTAINING FUSIBLE BINDERS

(75) Inventor: George C. Zguris, Canterbury, NH (US)

(73) Assignee: KVG Technologies, Inc., East Walpole, MA (US)

( * ) Notice: Subject to any disclaimer, the term of this patent is extended or adjusted under 35 U.S.C. 154(b) by 0 days.

(21) Appl. No.: 09/499,882

(22) Filed: Feb. 8, 2000

(51) Int. Cl.$^7$ .......................... H01M 10/14; H01M 2/16
(52) U.S. Cl. ...................... 29/623.1; 429/136; 429/143; 28/104
(58) Field of Search .................. 28/104; 29/623.1; 429/136, 143

(56) References Cited

U.S. PATENT DOCUMENTS

| | | | | |
|---|---|---|---|---|
| 4,265,985 A | * | 5/1981 | O'Rell et al. ............ | 429/252 X |
| 5,436,094 A | * | 7/1995 | Horimoto et al. ........... | 429/254 |
| 6,108,879 A | * | 8/2000 | Forte et al. .................. | 28/104 |

FOREIGN PATENT DOCUMENTS

| | | |
|---|---|---|
| EP | 0587682 B1 | 4/1995 |
| JP | 57098975 | 6/1987 |

OTHER PUBLICATIONS

A Paper Entitled "Sealed Car Battery" Which was Published by Mitsushita in Oct., 1986, in an Internal Newsletter.

* cited by examiner

*Primary Examiner*—John S. Maples
(74) *Attorney, Agent, or Firm*—David C. Purdue; John C. Purdue

(57) ABSTRACT

A method for producing a battery separator from a slurry of fibers which are resistant to the chemicals which are found in a battery, and a thermoplastic binder for the fibers. The method comprises the steps of casting the slurry onto a screen, draining the liquid of the slurry from fibers and binder which collect on the screen, and drying the fibers and binder without softening the binder. Subsequently, usually after the it has been rolled, packaged and shipped, the separator is cut to size and heated to soften the binder. In a preferred embodiment, the fibers are glass fibers having an average diameter less than 3 $\mu$m. In another preferred embodiment, the fibers are organic.

11 Claims, No Drawings

METHOD FOR PRODUCING A BATTERY WITH SEPARATORS CONTAINING FUSIBLE BINDERS

BACKGROUND OF THE INVENTION

1. Field of the Invention

The present invention relates generally to the field of batteries, especially to the field of recombinant or valve regulated lead acid ("VRLA") batteries and, more specifically, to a method for producing battery separators containing fusible binders and fibers, preferably, glass fibers. Such separators have been manufactured by a method which involves producing, by a wet paper making process, sheets of glass fibers and fusible fibers, and heating the fusible fibers to cause them to bond the sheet into a more or less stable condition. The sheets are sometimes formed into desired shapes, e.g., pockets into which battery plates can be inserted, and the edges are heated so that fusible fibers therein weld the sheets in the formed shapes. In use, the separators are positioned between the positive and negative plates of batteries, where they prevent metal conduction, but do not prevent the migration of ions, between the plates. Separators for VRLA batteries, in service, have unfilled voids through which oxygen can migrate between the positive and negative plates.

2. Description of the Prior Art

U.S. Pat. No. 4,265,985, granted May 5, 1981 to O'Rell et al., discloses the production of battery separator from a slurry composed of 30 to 70 weight percent of polyolefin fibers, 15 to 30 weight percent of a particulate siliceous filler and 1 to 35 weight percent of long fibers which are polyester paper making staple fibers, acrylic paper making staple fibers, glass fibers, or mixtures of polyester, acrylic and glass fibers. The slurry is cast on the screen of papermaking apparatus and is pressed between opposed hard rolls before being transferred to an open meslh metal belt and passed through an unheated oven and then over a plurality of cans with surfaces heated to about 270° F. The patent suggests that some bonding results from melting of the polyolefin fibers at fiber junctions.

A Japanese patent application published Jun. 19, 1982, under Number JP 57098975, discloses a separator produced from a slurry of glass fibers having an average diameter of 0.5 μm and polyethylene fibers having an average diameter of 20 μm. The slurry is cast on a screen as a narrow belt, dehydrated and dried. The dried separator is cut to size, and folded to form a bag; high frequency welding is then used to fuse the edges of the bag. The polyethylene fibers can constitute from 25 to 50 percent by weight of the total fibers.

A paper entitled "Sealed Car Battery" which was published by Mitsushita in October, 1986, in an internal newsletter, discloses that a newly developed separator provides improved reliability and productivity because it is in pouch form, and that an improvement was sought "by the addition of highly resilient PET resin fiber to the constituent material . . . " The authors were aware, the paper also says, that ultrasonic welding could be used to make a pouch form from a thick mat separator, but "a need to ratchet up the welding technology level was recognized."

U.S. Pat. No. 5,436,094, granted Jul. 25, 1995, assigned to Mitsui Petrochemical Industries, Ltd. ("Mitsui") discloses the production of a separator material "with melt adhesion bonds" from a slurry containing 5 to 95 percent by weight of a synthetic pulp, and 5 to 50 percent by weight of a polymer binder. The patent also discloses that 40 percent by weight or less of other synthetic or inorganic fibers can be used, naming, as "other synthetic or inorganic fibers", polypropylene, polyethylene, nylon, polyester, acrylic, Modacryl, glass, silica and rock wool fibers. The separator material is produced by dispersing in water and defiberizing, for example in a pulper, the synthetic pulp, binder and the auxiliary fibers, if used, refining the slurry, and feeding the refined slurry onto the wire of a Fourdrinier or other paper making machine. The web which forms on the wire is then sprayed with a surfactant and dehydrated by suction, by pressing, or both, and dried and heat treated to form melt-adhesion bonds "of the binder among tile fibers." The use of what is called "the method of the hot air through type" is disclosed as being operable for the heat treatment. This method is described as involving heating the dried web from above while withdrawing air from below as the web is being advanced on a "mesh-like" support, and heat treating by passing the heated web over a hot roll, through a hot oven, or through an infra-red heater, or by subjecting it to ultra-sonic energy.

EPO 587 682 B1, granted Apr. 12, 1995, discloses another method for producing a similar product from a mixture of glass fibers and at least one type of synthetic fibers. The synthetic fibers can be (a) a mixture of at least two types of fibers with different melting points, a first type which softens when the sheet is manufactured (i.e., during a heat treatment step) and a second type which melts when the sheet is formed, or (b) compound fibers, which can be of the sheath core or side by side type, consisting of a first synthetic material which softens when the sheet is manufactured (i.e., during a heat treatment step) and a second synthetic material which melts when the sheet is welded. In both cases, a separator material is produced by suspending the fibers in acidified water, casting the suspension on the screen of a paper making machine, and drying and heat treating the fibers; fiber to fiber bonds are formed as a consequence of the melting which occurs during the final heat treating step and subsequent re-solidification of the lower melting fibers or of the lower melting synthetic material of the composite fibers. The separator sheet can be cut to size and stacked between alternate positive and negative battery plates to produce assemblies which are used in the production of batteries, or it can, as the reference states, be welded by high frequency or ultrasonic welding to form pockets which receive the plates of batteries from which such assemblies are produced. The reference also states that high frequency or ultrasonic welding is desirable because it provides resistant welding whereas hot seam welding is much or fragile.

BRIEF DESCRIPTION OF THE PRESENT INVENTION

When separator produced by the methods of U.S. Pat. No. 5,436,094 and of EPO 587 682 B1 is cut to size, for example in preparation for the production of a stack of negative and positive battery plates with the separator positioned between adjacent plates, or for the production of a welded, envelope-type separator that is closed on all but one side, and in which a battery plate is encased, some of the separator necessarily becomes scrap. Furthermore, it is sometimes necessary to scrap separator, as produced, because its physical properties are not within specifications. Because of the bonds formed during production of the separator by the prior art methods, it is difficult, if not impossible, to produce a slurry containing that scrap and additional fibers which can be cast on the screen of a paper making machine to produce non-woven sheets from which additional separator can be made. The instant invention is based upon the discovery that separator material can be produced from a slurry formed by dispersing in water and defiberizing, for example in a pulper, glass fibers and heat bonding fibers, e.g., sheath-core fibers with a polyethylene sheath and a polypropylene core, refining, and feeding the resulting slurry onto the wire of a Fourdrinier or other paper making machine; the web which forms on the wire can then be sprayed, if desired, with a surfactant, dehydrated by suction, by pressing, or both, and dried at a temperature sufficiently low that melt-adhesion bonds do not form among the fibers. The unbonded, non-woven sheet which results can be tested to make sure that it meets specifications and, if so, can be rolled, packaged and shipped to another location, for example, from a separator manufacturer to a battery manufacturer. If the sheet does not meet specifications, it can be slurried, either alone or with additional fibers, and the slurry can be fed onto the wire of a Fourdrinier or other paper making machine and processed as described above to produce unbonded, non-woven sheet, so that the material which did not meet specifications is recycled. The separator which met specifications and was shipped can be removed from the package and cut to size, in preparation for the production of a stack of negative and positive battery plates with the separator positioned between adjacent plates, or for the production of welded separator that is closed on all but one side, and in which a battery plate can be encased. Scraps which are formed when the separator is cut to size can be slurried with additional fibers, water and the like, to produce a new slurry which can be fed onto the wire of a Fourdrinier or other paper making machine and processed as described above to produce non-woven separator. The sized, unbonded separator is then heated to a temperature sufficiently high to soften the binder, after which it is cooled to a temperature sufficiently low that the binder resolidifies and forms a bonded separator by binding the fibers to one another at points of contact; the bonded separator is then used to produce the stacks of negative and positive plates with separator between adjacent plates which are required for battery production. Separator which is produced according to the method of the instant invention has a given wet strength as produced, which is usually measured in the machine direction, which is the direction the material moves on the paper making machine, and in the transverse direction which is across the web at a right angle to the machine direction. The wet strength remains the same until after the material is bonded, which, the instant invention contemplates, will be done at a battery-making facility. After bonding, the wet strength is substantially higher than the given wet strength in both the machine direction and in the transverse direction.

DESCRIPTION OF THE PREFERRED EMBODIMENTS

In the following examples, and elsewhere herein, the terms "percent" and "parts" refer to percent and parts by weight, unless otherwise indicated; m means meter or meters, mm means millimeter or millimeters, g means gram or grams, $\mu$m means micrometer or micrometers, and all temperatures are in degrees C. These examples constitute the best modes presently contemplated by the inventor, but are presented solely to illustrate and disclose, and are not to be construed as limiting, the invention.

EXAMPLE 1

Glass fiber separator hand sheets were produced in a laboratory apparatus by depositing a furnish on a wire or screen, and draining the furnish. The apparatus comprised a tank with a screen in the bottom, a drain below the screen, a valve which opened and closed the drain, and paddles which were moved back and forth to simulate the movement of a furnish in commercial papermaking apparatus and establish a "machine direction" parallel to the direction of paddle movement. The furnish comprised acidified water, pH 2.7, and solids composed of 25 parts synthetic sheath core fibers having a polyester core and a polyester sheath, 13 parts Johns Manville 206 glass fibers, average fiber diameter of 0.76 $\mu$m, 52 parts Johns Mansville 210X glass fibers, average fiber diameter of 3.0 $\mu$m and 10 parts textile glass fibers ranging from about 6 to 8 mm in length. The furnish was poured into the apparatus and drained through the screen to produce a layer on the screen with a grammage of about 167 g/m$^2$. The separator hand sheets were heated in a drying oven to about 100° C. for 30 minutes, and were then found to have a thickness (under a load of 10.34 KPa) of 1 mm.

The furnish described above is also used to produce non-woven, un-bonded separator material on a Fourdrinier paper making machine where the final drying steps are controlled so that the separator is not heated to a temperature sufficiently high to soften the polyester sheath of the sheath core fibers, usually not higher than about 125° C. The dried separator is then rolled, packaged, and shipped to the plant of a battery manufacturer, where sheets are cut from the separator, heated to about 130° C., cooled and used to produce stacks of negative and positive plates with separator between adjacent plates. These stacks are then used to produce batteries.

The sheath core fibers used in Example 1 are commercially available under the designation Sofit N 720 from Kuraray.

The Johns Mansville 206 and 210 glass fibers used in Example 1 and in subsequent Examples have the same nominal compositions, but vary slightly from time to time. Mean values, in percent by weight, calculated from data furnished by Johns Mansville for the period when the examples were carried out, are given below:

| | |
|---|---|
| $SiO_2$ | 65.40 |
| $Al_2O_3$ | 2.99 |
| CaO | 5.88 |
| MgO | 2.79 |
| $Na_2O$ | 16.11 |
| $K_2O$ | 0.69 |
| $B_2O_3$ | 5.31 |
| $F_2$ | 1.02 |

Johns Mansville also indicates that the glass contains $Fe_2O_3$, $TiO_2$, $ZrO_2$, $Cr_2O_3$, SrO, BaO, MnO, ZnO, $Li_2O$, $SO_3$ and Pb in amounts less than 0.1%.

Various other slurries can be used as described in Example 1 to produce separator by the method of the instant invention. Examples of the solids, in parts by weight, in some such slurries are identified in the following table:

| Ingredients | Example 2 | Example 3 |
|---|---|---|
| Johns Mansville 206 glass fibers | 26 | 17.4 |
| Johns Mansville 210 X glass fiber | 39 | 69.6 |
| Sofit N 720 sheath core fibers | 25 | 3 |
| Textile glass fibers 6–8 mm long | 10 | 10 |

The separator produced by the method of any of Examples 1–3 can be cut to size and assembled between positive and negative plates to produce plate stacks which can then be used to produce complete batteries in a known manner. The steps of cutting the separator to size and producing assemblies of alternate positive and negative plates with separator between the plates are usually carried out by a battery manufacturer to whom the separator is shipped by the separator manufacturer. The separator of Examples 1–3 contains sheath core fibers with a thermoplastic polyester core and a thermoplastic polyester sheath which has a lower softening temperature than the core. It is desirable to heat the separator, before a battery is produced therefrom, so that the sheath is softened, and serves as a binder for the separator. Heretofore, this heating has been done by the separator manufacturer, who then rolled and packed the bonded separator, and shipped it to a battery manufacturer. The present invention is based upon the discovery that it is highly advantageous to postpone the heating step which produces the bonded separator until after the separator has been rolled and shipped to the battery manufacturer. The heating can be carried out after the separator has been cut to size, and either just before or just after it has been assembled between positive and negative battery plates. All scrap that is produced when the unbonded separator is cut to size can be recycled by adding it to a slurry of the same composition, and forming a separator as described above from that slurry.

It will be appreciated that the sheath core fibers ultimately served as binders for the glass fibers in the separators produced as described above. Other combination fibers can also be used in a similar manner, for example, sheath core or side by side fibers of polyethylene and polypropylene, the former preferably being the sheath when the fibers are of the sheath core type. Similarly, two different kinds of organic fibers can be substituted for the sheath core fibers. For example, a mixture of high density polyethylene synthetic pulp and thermally adhering polyester type composite fibers can replace the sheath core fibers. Suitable polyelefin synthetic pulps are disclosed in the Mitsui patent identified above, U.S. Pat. No. 5,436,094, as are suitable thermally adhering polyester type and polyester terephthalate composite fibers which are commercially available from Unitika Co. under the designations MELTY 4080 and Ester EP 303. The synthetic pulps identified in tables 1, 2 and 3, below, are disclosed by the Mitsui patent:

TABLE 1

|  | Type A | Types B and F | Type C | Type D |
| --- | --- | --- | --- | --- |
| Type | High density PE | Melty 4080[1] | High density PE | Linear low density PE |
| Average fiber length | 1.5 mm | 5 mm | 1.2 mm | 1.0 mm |
| Average fiber diameter | 20 μm | . . . | 20 μm | 30 μm |
| Denier | . . . | 2 | . . . | . . . |
| Specific surface area | 5.4 m²/g | . . . | 8.2 m²/g | . . . |
| Drainage factor | 0.3 sec/g | . . . | 1.2 sec/g | . . . |
| Melting point | 135° C. | . . . | 135° C. | 125° C. |
| Melting adhering temperature | . . . | 110° C. | . . . | . . . |

[1]Thermally adhering polyester type composite fibers. Unitika Co.

TABLE 2

|  | Type E | Type G | Type H |
| --- | --- | --- | --- |
| Type | PP | High density PE | Ester EP 303[2] |
| Average fiber length | 1.2 mm | 1.5 mm | 5 mm |
| Average fiber diameter | 30 μm | 20 μm | . . . |
| Fiber denier | . . . | . . . | 3d. |
| Specific surface area | . . . | . . . | . . . |
| Drainage factor | 0.2 sec/g | 6.3 sec/g | . . . |
| Melting point | 165° C. | 135° C. | 260° C. |

[2]Polyethylene terephthalate fibers. Unitika Co.

TABLE 3

|  | Type I | Type J | Type K |
| --- | --- | --- | --- |
| Type | Low density polyethylene powder | Glass | High density PE Pulp |
| Average fiber length | . . . | 5 mm | 1.0 mm |
| Average fiber diameter | . . . | 2 μm | 8 μm |
| Average particle diameter | 40 μm | . . . | . . . |
| Specific surface area | . . . | . . . | . . . |
| Drainage factor | . . . | . . . | 0.5 sec/g |
| Melting point | 110° C. | . . . | 135° C. |

The following compositions, in parts by weight, are disclosed by the Mitsui patent as suitable for use in producing separator according to the method of Examples 1–4 of that patent.

|  | Example 1 | Example 2 | Example 3 | Example 4 |
| --- | --- | --- | --- | --- |
| Type A polyethylene pulp | 80 | . . . | . . . | 70 |
| Polyester type composite fibers (MELTY 4080) | 20 | 20 | . . . | . . . |
| Type C polyethylene pulp | . . . | 80 | 80 | . . . |
| Type D polyethylene pulp | . . . | . . . | 20 | 30 |

The following compositions, in parts by weight, are disclosed by the Mitsui patent as suitable for use in producing separator according to the method of Examples 5 and 7–10 of that patent (Example 6 is patently garbled, stating that 70% by weight of each of two constituents was used).

|  | Example 5 | Example 7 | Example 8 | Example 9 | Example 10 |
| --- | --- | --- | --- | --- | --- |
| Type A polyethylene pulp | . . . | 70 | 70 | 70 | . . . |
| Type D polyethylene pulp | 30 | 20 | . . . | 20 | . . . |
| Type E polyethylene pulp | 70 | . . . | . . . | . . . | . . . |
| Type H polyethylene-Terephthalate fibers | . . . | 10 | 10 | . . . | . . . |
| Type I, polyethylene powder | . . . | . . . | 20 | . . . | . . . |
| Type J glass fibers | . . . | . . . | . . . | 10 | . . . |
| Type B or F, MELTY 4080 | . . . | . . . | . . . | . . . | 20 |
| Type K polyethylene pulp | . . . | . . . | . . . | . . . | 80 |

The procedures of Example 1 through 5 and 7 through 10 of the Mitsui patent are repeated, except that the final heating of the separator is to a temperature sufficiently low that melting of the constituents of the separator does not occur. Accordingly, these procedures constitute practice of the method of the instant invention. The separator that is produced when these procedures are repeated is composed of a major portion of fibers which are comparatively high melting and a minor portion of a substantially lower melting, binder material. It is desirable to heat the separator, before the production of a battery therefrom is complete, so that at least the lower melting binder material is softened, and serves as a binder for the separator. This heating can be carried out after the separator has been cut to size, or even after it has been assembled between positive and negative battery plates. All scrap that is produced when the separator is cut to size can be recycled by adding it to a slurry of the same composition, and forming a separator as described above from that slurry.

The procedures of Examples 1 through 5 and 7 through 10 of the Mitsui patent are also repeated, except that a slurry is made from glass fibers and the constituents of one of the Mitsui examples, and that slurry is cast on a screen, drained and dried at a temperature sufficiently low that melting of the constituents of the separator does not occur. It is usually preferred that the glass fibers constitute from about 70 to 97 percent of the solids in the slurry, that the glass fibers have an average fiber diameter not greater than about 3 $\mu$m and be composed of a glass which is resistant to sulfuric acid and other constituents that are present in storage batteries. In these instances, the separator that is produced is composed of glass fibers, a comparatively low melting binder material and a higher melting binder material. The procedures are also repeated, except that the proportions of the lower melting binder material and of the higher melting binder material are changed so that, in different procedures, each constitutes from 30 percent to 70 percent.

The procedures of Examples 1–3 hereof are also repeated, except that other sheath core and side by side fibers are substituted for the fibers designated "Sofit N 720" which were used in the Example 1–3 procedures, and the proportions of glass fibers vary from about 50 to 97 percent, while the proportions of sheath core and side by side fibers vary from about 3 to 50 percent. Preferably, the proportions of glass fibers vary from about 70 to 95 percent, while the proportions of sheath core and side by side fibers vary from about 5 to 30 percent.

It will be appreciated that various changes and modifications can be made from the specific details of the invention as described herein without departing from the spirit and scope of the attached claims and that, in its essential details, the invention is a method for producing a battery separator from a slurry of fibers which are resistant to the chemicals which are found in a battery, and a thermoplastic binder for the fibers. The method comprises casting the slurry onto a screen, draining the liquid of the slurry from fibers and binder which collect on the screen, and drying the fibers and binder without softening the binder. In a preferred case, when the separator is to be used with a lead-acid battery, the fibers are glass, and have an average diameter not greater than about 3 $\mu$m, or a mixture of such glass fibers and organic fibers, most desirably polyolefin fibers, polyethylene terephthalate fibers, or mixtures of the two. It is also preferred that at least some, preferably at least 50 percent, of the glass fibers be microfibers, i.e., have diameters less than 1 $\mu$m. It is also desirable for at least some of the organic fibers to be sheath core fibers having a thermoplastic core and a thermoplastic sheath which has a lower softening temperature. Sheath core fibers having a polypropylene core and a polyethylene sheath are highly desirable. In another preferred instance, when the separator is to be used with an alkaline battery, the fibers are organic, most desirably polyolefin fibers or polyethylene terephthalate, and have an average diameter not greater than about 3 $\mu$m. In either case, after processing of the separator is complete, e.g., after it has been cut to size for stacking with battery plates, it is heated to a temperature sufficiently high to activate the thermoplastic binder. When a separator produced by the method of the invention is welded, e.g., to form it into a pocket in which a battery plate is received, the thermoplastic binder is activated, as is any higher melting thermoplastic material therein.

I claim:

1. A method for producing an assembly for use in a battery which contains an electrolyte, the assembly comprising a plurality of positive and negative plates with a separator between adjacent ones of the plates of the assembly, said method comprising the steps of producing the separator by casting onto a screen a slurry of fibers and a thermoplastic binder for the fibers, both of which are resistant to the chemicals in the battery eletrolyte, draining the liquid of the slurry from the fibers and binder which collect on the screen, producing unbonded separator by heating the fibers and binder to cause drying thereof without softening of the binder, rolling the unbonded separator, and producing the assembly by heating the previously rolled unbonded separator to a temperature sufficiently high to soften the binder, cooling the separator to a temperature sufficiently low that the binder resolidifies and forms bonded separator by binding the fibers to one another at points of contact, cutting sheets of the size required to produce the assembly from the bonded separator, and assembling alterating positive and negative battery plates with the sheets of the separator between adjacent ones of the plates.

2. A method as claimed in claim 1 for producing an assembly for use in a battery wherein alternating positive and negative battery plates are assembled with sheets of the unbonded separator between adjacent ones of the plates, and the unbonded separator in the assembly is then heated to a temperature sufficiently high to make the thermoplastic binder effective as a binder for the fibers.

3. A method as claimed in claim 1 for producing an assembly for use in a battery wherein the fibers are glass fibers and the thermoplastic binder is organic.

4. A method as claimed in claim 1 for producing an assembly for use in a battery wherein the fibers are polyolefin fibers and the thermoplasic binder is an organic having a softening temperature lower than that of the polyolefin fibers.

5. A method as claimed in claim 1 for producing an assembly of positive and negative battery plates with a separator between adjacent ones of the plates of the assembly, wherein the separator is fabricated to form a plurality of pockets, one of the plates is placed in each of the separator pockets, and the assembly of battery plates is produced from a plurality of the plates in separator pockets and additional battery plates between adjacent ones of the plates in separator pockets.

6. A method as claimed in claim 5 for producing an assembly of positive and negative battery plates with a separator between adjacent ones of the plates of the assembly wherein the fibers from which the slurry is formed are glass fibers and the thermoplastic binder is organic.

7. A method as claimed in claim 5 for producing an assembly of positive and negative battery plates with a separator between adjacent ones of the plates of the assembly wherein the fibers from which the slurry is formed are polyolefin fibers and the thermoplastic binder is an organic having a softening temperature lower than that of the polyolefin fibers.

8. A method as claimed in claim 3 for producing an assembly of positive and negative battery plates with a separator between adjacent ones of the plates of the assembly wherein not more than 10 percent of the glass fibers have diameters greater than 3 $\mu$m and at least 50 percent of the glass fibers have diameters less than 1 $\mu$m.

9. A method as claimed in claim 3 for producing an assembly of positive and negative battery plates with a separator between adjacent ones of the plates of the assembly wherein at least 30 percent of the fibers of the slurry are glass fibers.

10. A method as claimed in claim 3 for producing an assembly of positive and negative battery plates with a separator between adjacent ones of the plates of the assembly wherein from 50 to 97 percent of the fibers of the slurry are glass fibers.

11. A method for producing a separator for use in a battery which contains an electrolyte, said method comprising the steps of casting onto a screen a slurry of fibers and a thermoplastic binder for the fibers, both of which are resistant to the chemicals in the battery electrolyte, draining the liquid of the slurry from the fibers and binder which collect on the screen, producing unbonded separator by heating the fibers and binder to cause drying thereof without softening of the binder, and rolling the unbonded separator.

* * * * *